United States Patent
Liu et al.

(10) Patent No.: US 8,883,281 B2
(45) Date of Patent: Nov. 11, 2014

(54) MULTILAYER FILM HAVING PRESSURE SENSITIVE ADHESIVE LAYER

(75) Inventors: Xipeng Liu, East Providence, RI (US); James R. Kempskie, Southbridge, MA (US); Michael J. Tzivanis, Chicopee, MA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 224 days.

(21) Appl. No.: 13/329,074

(22) Filed: Dec. 16, 2011

(65) Prior Publication Data

US 2013/0078462 A1 Mar. 28, 2013

Related U.S. Application Data

(60) Provisional application No. 61/424,507, filed on Dec. 17, 2010.

(51) Int. Cl.
*B32B 9/00* (2006.01)
*B32B 33/00* (2006.01)
*B32B 7/12* (2006.01)
*C09J 7/00* (2006.01)

(52) U.S. Cl.
CPC .... *B32B 7/12* (2013.01); *C09J 7/00* (2013.01); *B32B 2307/21* (2013.01)
USPC ........................................ 428/40.1; 428/41.8

(58) Field of Classification Search
CPC ........... B32B 7/12; B32B 2307/21; C09J 7/00
USPC ................................. 428/40.1, 41.7
See application file for complete search history.

(56) References Cited

U.S. PATENT DOCUMENTS

| 3,518,325 | A | * | 6/1970 | Sprenger et al. | 525/478 |
| 4,074,000 | A | | 2/1978 | Hankee et al. | |
| 5,110,388 | A | * | 5/1992 | Komiyama et al. | 156/229 |
| 6,187,432 | B1 | | 2/2001 | Krish et al. | |
| 7,671,144 | B2 | | 3/2010 | Fujimoto et al. | |
| 7,682,692 | B2 | | 3/2010 | Amano et al. | |
| 7,695,818 | B2 | | 4/2010 | Sherman et al. | |
| 2003/0012936 | A1 | | 1/2003 | Draheim et al. | |
| 2009/0105407 | A1 | | 4/2009 | Karjala et al. | |

(Continued)

FOREIGN PATENT DOCUMENTS

EP 1591506 B1 11/2005
EP 1621596 B1 2/2006

(Continued)

OTHER PUBLICATIONS

The International Search Report and the Written Opinion for International Application No. PCT/US2012/069226 dated Aug. 21, 2013, 12 pages.

*Primary Examiner* — Victor Chang
(74) *Attorney, Agent, or Firm* — Chi Suk Kim; Abel Law Group, LLP

(57) ABSTRACT

A multilayer film includes a substrate film having first and second major surfaces and a pressure sensitive adhesive layer disposed on the first major surface of the substrate film. The pressure sensitive adhesive layer includes a curable composition. The multilayer film further includes a release layer disposed on the pressure sensitive adhesive layer opposite the substrate film. The release layer includes a release material and a catalyst to cure the curable composition.

20 Claims, 2 Drawing Sheets

(56) References Cited

U.S. PATENT DOCUMENTS

2009/0269535 A1 10/2009 Lu et al.
2009/0294023 A1 12/2009 Beger et al.
2011/0171410 A1 7/2011 Nakagawa et al.

FOREIGN PATENT DOCUMENTS

| EP | 2128211 A1 | 12/2009 |
| EP | 2147935 A2 | 1/2010 |
| WO | 2010/010030 A1 | 1/2010 |

* cited by examiner

MULTILAYER FILM HAVING PRESSURE SENSITIVE ADHESIVE LAYER

CROSS-REFERENCE TO RELATED APPLICATION(S)

The present application claims priority from U.S. Provisional Patent Application No. 61/424,507, filed Dec. 17, 2010, entitled "Multilayer Film having Pressure Sensitive Adhesive Layer," naming inventors Xipeng Liu, James R. Kempskie, and Michael J. Tzivanis, which application is incorporated by reference herein in its entirety.

FIELD OF THE INVENTION

This disclosure, in general, relates to multilayer release films having pressure sensitive adhesive layers and methods for making such films.

BACKGROUND

Multilayer films are finding increased usage in industry. For example, films can be used as protective couplings, masks, labels, temporary security devices, or any combination thereof. Clear films are being used as protective covers on display devices such as the display of a cell phone, portable gaming devices, or even a television. Films are also used as protective coverings on parts to reduce scratching and protect the color.

Many such films are adhered to a surface using adhesive. In particular, the films can include a pressure sensitive adhesive. However, achieving the desired tackiness in a pressure sensitive adhesive coated on to the multilayer film is a time consuming process and in some cases requires elevated temperatures.

Improper curing can lead to poor adhesion of the multilayer film or can lead to undesirably excessive adhesion, particularly in removable films. In many cases, catalysts are added to the pressure sensitive adhesive formulation to control the curing. However, adding too much catalyst to the pressure sensitive adhesive formulation can lead to significantly reduced pot life and unacceptably high viscosity.

As such, improved multilayer film having a pressure sensitive adhesive would be desirable.

DETAILED DESCRIPTION

In a particular embodiment, a multilayer film includes a substrate film, a pressure sensitive adhesive layer overlying the substrate film, and a release layer or coating in contact with the pressure sensitive adhesive layer. The release layer or coating includes a release material and an agent having activity on a component of the pressure sensitive adhesive layer. The substrate can include a polymer film and can include an antistatic layer disposed either between the polymer film and the pressure sensitive adhesive layer or disposed on an opposite surface of the polymer film from the pressure sensitive adhesive layer. In another example, a liner film can be applied over the release coating to facilitate removal of the release coating from the pressure sensitive adhesive at the point of end use. In a particular example, the multilayer film can be dispensed from a roll.

In another exemplary embodiment, a method of forming a multilayer film includes dispensing a substrate film, coating a pressure sensitive adhesive composition on the substrate film, and coating a release coating on the pressure sensitive adhesive composition. The release coating includes a release material and an agent active to a component of the pressure sensitive adhesive composition. Optionally, a liner film can be applied over the release coating. Alternatively, the release coating can be applied on an opposite surface of the substrate film relative to the pressure sensitive adhesive layer such that the release coating contacts the pressure sensitive adhesive composition when the multilayer film is rolled into a roll. In a further example, the substrate film can include an antistatic layer. Alternatively, an antistatic layer can be coated on a major surface of the polymer film and cured.

Figure 1:
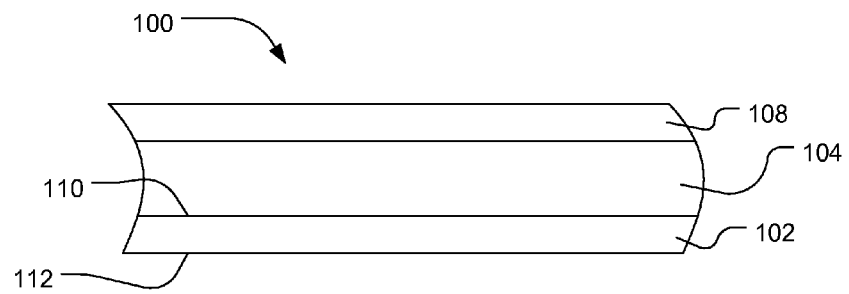
FIG. 1, FIG. 2, FIG. 3, and FIG. 4 include illustrations of exemplary multilayer films.

FIG. 1 includes an illustration of an exemplary multilayer film 100. For example, the multilayer film 100 includes a substrate film 102, a pressure sensitive adhesive layer 104, and a release coating 108. The release coating 108 is in contact with the pressure sensitive adhesive layer 104. The pressure sensitive adhesive layer 104 can be in direct contact with a major surface 110 of the substrate film 102 or there can be intervening layers between the substrate film 102 and the pressure sensitive adhesive layer 104. As illustrated, a second major surface 112 of the substrate film 102 can form an outer layer of the multilayer film 100.

In an example, the substrate film 102 includes one or more layers of polymeric material. For example, a polymeric material can be a thermoplastic polymeric material. In another example, the polymeric layer can be a thermoset material. In a particular example, the polymeric layers are extruded layers. The extruded layers can include additional coatings. In an example, the polymeric material includes a polyolefin, an acetate polymer, an acrylic polymer, a polyaryletherketone, a polyester, a polycarbonate, a polyvinyl chloride, a polyether, a polyamide, polyimide, a thermoplastic elastomer, a liquid crystal polymer, a fluoropolymer, or any combination thereof.

An exemplary polyolefin includes a polyolefin homopolymer, such as polyethylene, polypropylene, polybutene, polypentene, or polymethylpentene; a polyolefin copolymer, such as ethylene-propylene copolymer, ethylene-butene copolymer, or ethylene-octene copolymer; or any blend or combination thereof. An exemplary polyethylene includes high density polyethylene (HDPE), medium density polyethylene (MDPE), low density polyethylene (LDPE), ultra low density polyethylene, or any combination thereof. An exemplary polyamide includes nylon 6, nylon 6,6, nylon 11, nylon 12, or any combination thereof. A particular vinyl acetate includes ethylene vinyl acetate (EVA). An exemplary polyaryletherketone can include polyetherketone, polyetheretherketone, polyetheretherketoneketone, or any combination thereof. In a particular example, the polyaryletherketone can include polyetheretherketone (PEEK).

An exemplary fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), a terpolymer of ethylene, hexafluoropropylene, and tetrafluoroethylene, or any combination thereof.

An acrylic polymer can include polyacrylate, poly methyl methacrylate, poly methacrylate, or any combination, and may, for example, be an impact grade or impact modified acrylic. Impact-modified acrylic polymers generally comprise a copolymer of monomers of acrylic monomers with an effective amount of suitable comonomer or graft moiety to produce the desired elastic modulus and impact resistance. An acrylic elastomer, sometimes referred to as acrylate rubber, polyacrylate rubber, polyacrylic elastomer or "ACM" and which is a composition based on a mixture of a polyacrylate and polymethacrylate, a polyacrylate and ethylene methacrylate copolymer ("EMAC") (such as Chevron Chemicals EMAC 2260), or a polyacrylate and ethylene butylacrylate ("EBAC") can be used. Alternatively, a thermoplastic impact-modified acrylic polymer can be a blend of a clear glassy acrylic polymer, such as a plastic copolymer of ethylene and a carboxylic acid compound selected from acrylic acid, methacrylic acid and mixtures thereof, with elastomeric components.

An exemplary thermoplastic elastomer can include a blend of polyolefin and elastomeric vulcanate. For example, the thermoplastic elastomer can include a polyolefin and an elastomer dispersed in the polyolefin. An exemplary elastomer can include a diene elastomer. A diene elastomer is a cross-linkable copolymer including a diene monomer, for example, ethylene propylene diene monomer (EPDM), ABS, or any combination thereof. Additional exemplary elastomer can include elastomeric blends of olefins, commonly known as thermoplastic olefins (TPOs).

In a further example, the polymer is a polyester, such as polyethylene terephthalate. In another example the polyester is polyethylene naphthalate (PEN). In another example, the polyester is a liquid crystal polymer. An exemplary liquid crystal polymer includes aromatic polyester polymers, such as those available under tradenames XYDAR® (Amoco), VECTRA® (Hoechst Celanese), SUMIKOSUPER™ (Sumitomo Chemical), EKONOL™ (Saint-Gobain), DuPont HX™ or DuPont ZENITE™ (E.I. DuPont de Nemours), RODRUN™ (Unitika), GRANLAR™ (Grandmont), or any combination thereof. Liquid crystal polymers include thermotropic (melt processable) liquid crystal polymers wherein constrained microlayer crystallinity can be particularly advantageous.

Returning to FIG. 1, the substrate film 102 can have a thickness in a range of 0.5 mils to 10 mils, such as a range of 0.5 mils to 5.0 mils, a range of 1 mil to 5.0 mils, or even a range of 1 mil to 3 mils.

The pressure sensitive adhesive layer 104 can be formed of a curable pressure sensitive adhesive composition. A pressure sensitive adhesive is an adhesive for which the degree of bond is influenced by the amount of pressure which is used to apply the adhesive to the surface. For example, the pressure sensitive adhesive composition can include natural rubber, a styrenic block copolymer, an acrylate, a polyurethane, a silicone, polydiorganosiloxane polyurea copolymers, or any combination thereof. An exemplary styrenic block copolymer includes styrene butadiene copolymer (SBR), styrene/isoprene/styrene block copolymer (SIS), acrylonitrile/styrene block copolymer, or any combination thereof.

The acrylic polymer can be derived from a monomer, such as an alkyl (meth)acrylate, alkyl acrylate, or alkyl methacrylate. Examples of the alkyl (meth)acrylate include methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isoamyl (meth)acrylate, neopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, or any combination thereof. In particular, the acrylic polymer can be poly methyl (meth)acrylate.

In another example, the acrylic polymer can be a copolymer derived from at least one acrylate monomer and at least one polymerizable comonomer. An exemplary polymerizable comonomer includes acrylonitriles, acrylamides, methacrylamides, vinyl esters, vinyl ethers, vinyl amides, vinyl ketones, styrenes, halogen containing monomers, ionic monomers, acid containing monomers, base containing monomers, monomers having both a reactive silicon containing group and a polymerizable unsaturated group, olefins, or any combination thereof. In a further example, an acrylic polymer backbone can be grafted with macromers having a polyether backbone, such as poly(ethylene glycol) (PEG), poly(propylene glycol) (PPG), and poly(tetramethylene glycol) (PTMG), or any combination thereof.

In another example, the pressure sensitive adhesive layer 104 includes a polyurethane. For example, the polyurethane pressure sensitive adhesive can be formed by the reaction of an isocyanate and a polyol. The isocyanate component can include methylene diphenyl diisocyanate (MDI), toluene diisocyanate (TDI), hexamethylene diisocyanate (HDI), isophorone diisocyanate (IPDI), or any combination thereof. In an example, the isocyanate can include methylene diphenyl diisocyanate (MDI) or toluene diisocyanate (TDI). In particular, the isocyanate includes methylene diphenyl diisocyanate (MDI) or derivatives thereof.

In an example, the polyol can be a polyether polyol, a polyester polyol, modified or grafted derivatives thereof, or any combination thereof. A suitable polyether polyol can be produced by polyinsertion via double metal cyanide catalysis of alkylene oxides, by anionic polymerization of alkylene oxides in the presence of alkali hydroxides or alkali alcoholates as catalysts and with the addition of at least one initiator molecule containing 2 to 6, preferably 2 to 4, reactive hydrogen atoms in bonded form, or by cationic polymerization of alkylene oxides in the presence of Lewis acids, such as antimony pentachloride or boron fluoride etherate. A suitable alkylene oxide can contain 2 to 4 carbon atoms in the alkylene radical. An example includes tetrahydrofuran, 1,2-propylene oxide, 1,2- or 2,3-butylene oxide; ethylene oxide, 1,2-propylene oxide, or any combination thereof. The alkylene oxides can be used individually, in succession, or as a mixture. An example of an initiator molecule includes water or dihydric or trihydric alcohols, such as ethylene glycol, 1,2-propanediol and 1,3-propanediol, diethylene glycol, dipropylene glycol, ethane-1,4-diol, glycerol, trimethylol propane, or any combination thereof.

The curable pressure sensitive adhesive composition can include a cross-linking agent, a catalyst, a tackifying resin, or any combination thereof.

An exemplary crosslinking agent includes multifunctional ethylenically unsaturated monomers. Such monomers include, for example, divinyl aromatics, divinyl ethers, multifunctional maleimides, multifunctional acrylates and methacrylates, and the like, or any combination thereof. An exemplary divinyl aromatics includes divinyl benzene. An exemplary multifunctional (meth)acrylates can include tri(meth)acrylates or di(meth)acrylates, which are compounds including three or two (meth)acrylate groups. An exemplary tri(meth)acrylate includes trimethylolpropane tri(meth)acrylate, propoxylated trimethylolpropane triacrylates, ethoxylated trimethylolpropane triacrylates, tris(2-hydroxy ethyl) isocyanurate triacrylate, pentaerythritol triacrylate, or any combination thereof. A exemplary di(meth)acrylates includes ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylates, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth)acrylates, urethane di(meth) acrylates, or any combination thereof.

Another exemplary cross-linking agent includes copolymers of an alkyl methacrylate such as methyl methacrylate with a monomer providing a reactive amino, epoxy, hydroxyl and or carboxyl group and a terminal vinyl group end block, tapered or random copolymers of styrene with butadiene or isoprene that have been epoxidized and contain a terminal vinyl group or any combination thereof.

A further exemplary cross-linking agent includes an isocyanate-based crosslinking agent, such as aliphatic polyisocyanates, alicyclic polyisocyanates, aromatic polyisocyanates, aromatic aliphatic polyisocyanates, as well as dimers and trimers thereof and reaction products or polymers thereof. An example of the isocyanate-based crosslinking agent includes tolylene diisocyanate, hexamethylene diisocyanate, polymethylene polyphenylisocyanate, diphenylmethane diisocyanate, dimer of diphenylmethane diisocyanate, reaction products of trimethylolpropane and tolylene diisocyanate, reaction products of trimethylolpropnae and hexamethylene diisocyanate, polyether polyisocyanates, polyester polyisocyanates, or any combination thereof. Another cross-linking agent includes a Si—H terminated molecule.

The crosslinking agent is used in an effective amount sufficient to cause crosslinking of the pressure sensitive adhesive to provide adequate cohesive strength to produce the desired final adhesion properties to the substrate of interest. The crosslinking agent can be used in an amount of 0.01 part to 20 parts, such as 0.1 to 10 parts, based on the total weight of monomers. For example, the amount of the isocyanate-based compound to be used is about 0.01 to 20 parts by weight, such as 0.05 to 15 parts by weight based on 100 parts by weight of the polymer.

The catalyst can include an organometallic catalyst, an amine catalyst, or a combination thereof. An organometallic catalyst, for example, can include dibutyltin dilaurate, a lithium carboxylate, tetrabutyl titanate, a bismuth carboxylate, or any combination thereof. In another example, the catalyst can include platinum-vinylsiloxane, platinum-olefin complexes, such as Pt-divinyl tetramethyl disiloxane, or any combination thereof.

An exemplary titanium catalyst includes organofunctional titanates, siloxytitanates, or any combination thereof. An exemplary organofunctional titanates includes 1,3-propanedioxytitanium bis(ethylacetoacetate); 1,3-propanedioxytitanium bis(acetylacetonate); diisopropoxytitanium bis (acetylacetonate); 2,3-di-isopropoxy-bis(ethylacetate) titanium; titanium naphthenate; tetrapropyltitanate; tetrabutyltitanate; tetraethylhexyltitanate; tetraphenyltitanate; tetraoctadecyltitanate; tetrabutoxytitanium; tetraisopropoxytitanium; ethyltriethanolaminetitanate; a betadicarbonyltitanium compound such as bis(acetylacetonyl) diisopropyltitanate; or any combination thereof. Siloxytitanates include tetrakis(trimethylsiloxy)titanium, bis (trimethylsiloxy)bis(isopropoxy)titanium, or any combination thereof.

An exemplary tin compound includes dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin dineodeconoate; triethyl tin tartrate; dibutyl tin dibenzoate; tin oleate; tin naphthenate; butyltintri-2-ethylhexoate; tin butyrate; or any combination thereof. In another example, the catalyst can include a zirconium compound, such as zirconium octoate.

An amine catalyst can include a tertiary amine, such as tributylamine, N-methyl morpholine, N-ethyl morpholine, N,N,N',N'-tetramethyl ethylene diamine, pentamethyl diethylene triamine and higher homologues, 1,4-diazabicyclo-[2,2,2]-octane, N-methyl-N'-dimethylaminoethyl piperazine, bis(dimethylaminoalkyl)piperazine, N,N-dimethyl benzylamine, N,N-dimethyl cyclohexylamine, N,N-diethyl benzylamine, bis(N,N-diethylaminoethyl) adipate, N,N,N',N'-tetramethyl-1,3-butane diamine, N,N-dimethyl-(3-phenyl ethylamine, bis(dimethylaminopropyl)urea, bis(dimethylaminopropyl)amine, 1,2-dimethyl imidazole, 2-methyl imidazole, monocyclic and bicyclic amidine, bis(dialkylamino) alkyl ether, such as e.g., bis(dimethylaminoethyl)ethers, tertiary amines having amide groups (such as formamide groups), or any combination thereof. Another example of a catalyst component includes Mannich bases including secondary amines, such as dimethylamine, or aldehyde, such as formaldehyde, or ketone such as acetone, methyl ethyl ketone or cyclohexanone or phenol, such as phenol, nonyl phenol or bisphenol. A catalyst in the form of a tertiary amine having hydrogen atoms that are active with respect to isocyanate groups can include triethanolamine, triisopropanolamine, N-methyldiethanolamine, N-ethyl diethanolamine, N,N-dimethyl ethanolamine, reaction products thereof with alkylene oxides such as propylene oxide or ethylene oxide, or secondary-tertiary amines, or any combination thereof. Silamines with carbon-silicon bonds can also be used as catalysts, for example, 2,2,4-trimethyl-2-silamorpholine, 1,3-diethyl aminomethyl tetramethyl disiloxane, or any combination thereof.

In a further example, the amine catalyst is selected from a pentamethyl diethylene triamine, dimethylaminopropylamine, N,N' dimethylpiperazine and dimorpholinoethylether, N,N' dimethyl aminoethyl N-methyl piperazine, JEFFCAT®DM-70 (a mixture of N,N' dimethylpiperazine and dimorpholinoethylether), imadozoles, triazines, or any combination thereof.

Catalysts for free-radical polymerization can include free-radical initiators, such as initiators of the azo type, for example, 2,2'-azobis(isobutyronitrile). Other initiators include peroxide initiators, including dialkyl peroxides such as di-t-butyl peroxide, 2,5-dimethyl-2,5-di(t-butylperoxy) hexane, 2,5-dimethyl-2,5-di(t-butylperoxy)-3-hexyne, dicumyl peroxide, t-butyl cumyl peroxide and α,60'-bis(t-butylperoxy)isopropylbenzene, diacyl peroxides such as benzoyl peroxide, p-chlorobenzoyl peroxide, m-chlorobenzoyl peroxide, 2,4-dichlorobenzoyl peroxide, lauroyl peroxide, peroxy esters such as t-butyl perbenzoate, peroxydicarbonates such as diisopropyl peroxydicarbonate and di-2-ethylhexyl peroxydicarbonate, peroxy ketals such as 1,1-di(t-butylperoxy)cyclohexane and 1,1-di(t-butylperoxy)-3,3,5-trimethylcyclohexane, or any combination thereof. Peroxyesters include t-amyl peroxy-2-ethylhexanoate, t-butyl peroxy-2-ethylhexanoate, or any combination thereof. A particularly useful peroxyester as a secondary initiator to reduce residual monomer is t-amyl peroxypivalate.

A tackifier can be combined with the adhesive composition. The tackifier can be substantially compatible with the base polymer. "Substantially compatible" means that when the tackifier and the polymer are combined, the resulting combination is substantially transparent in dry film form, as opposed to opaque, to normal vision. Exemplary tackifiers include rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters, or any combination thereof.

Another exemplary tackifier includes terpene resins, which are hydrocarbons of the formula $C_{10}H_{16}$, occurring in most essential oils and oleoresins of plants, and phenol modified terpene resins like alpha pinene, beta pinene, dipentene, limonene, myrecene, bornylene, camphene, or any combination thereof. Exemplary tackifiers can also include aliphatic hydrocarbon resins, aromatic hydrocarbon resins, for example, based on C9, C5, dicyclopentadiene, coumarone, indene, styrene, substituted styrenes and styrene derivatives and the like, or any combination thereof. Another exemplary tackifier includes liquid paraffin, such as alkylnaphthenes.

The amount of tackifier can be in a range of 0% to 60%, such as a range of 5% to 60% by weight total of one or more tackifiers.

The pressure sensitive adhesive composition can also include, diluents, emollients, plasticizers, excipients, antioxidants, UV stabilizers, UV absorbers, anti-irritants, opacifiers, fillers, such as clay and silica, pigments and mixtures thereof, preservatives, as well as other components or additives.

Returning to FIG. 1, the pressure sensitive adhesive layer 104 can have a thickness in a range of 0.1 mils to 10 mils, such as a range of 0.25 mils to 5.0 mils, a range of 0.25 mils to 2 mils, or even a range of 0.25 mils to 1 mil.

The release layer or coating 108 can include a composition immiscible with the pressure sensitive adhesive composition. The release layer or coating 108 can be in direct contact with the pressure sensitive adhesive layer 104. In particular, at least a portion of the release layer or coating 108 can be easily separated from the pressure sensitive layer 104. For example, the release layer or coating 108 can include a release material, such as a silicone-based, fluorine-based, long-chain alkyl-based, fatty acid amide-based, silica powder material, or any combination thereof. An example release material is a silicone-based release material, such as an addition-curable and condensation-curable silicone. In this type of release material, a platinum (Pt) or rhodium (Rh) catalyst is used in general as the curing catalyst for the release agent.

Alternatively, the release material can be formed of greases or oils that maintain some viscosity. For example, the release material can include a silicone grease, a fluorosilicone oil, a phenylsilicone oil, a paraffin wax, or any combination thereof.

In a particular example, the release coating 108 includes an agent, such as a catalyst, active to facilitate curing of the curable pressure sensitive adhesive composition. For example, the agent can facilitate crosslinking of at least one component of the pressure sensitive adhesive composition. In particular, the release coating 108 can include an agent, such as a catalyst described above, in an amount in a range of 0.01 wt % to 5.0 wt %, such as a range of 0.1 wt % to 2.5 wt %, a range of 0.5 wt % to 2.0 wt %, or even a range of 0.5 wt % to 1.5 wt %.

The release coating 108 can have a thickness in a range of 0.025 mils to 10 mils, such as a range of 0.025 mils to 5.0 mils, a range of 0.25 mils to 2 mils, or even a range of 0.25 mils to 1 mil.

Figure 2:
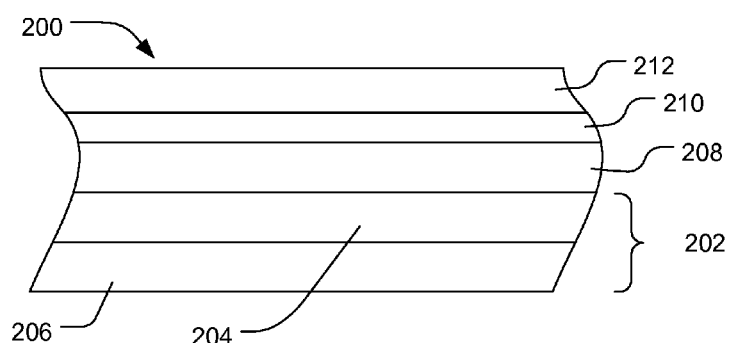

In a particular embodiment illustrated in FIG. 2, a multilayer film 200 includes a substrate film 202 including more than one layer. For example, the polymeric substrate 202 can include a polymer film 204 and an antistatic layer 206. A pressure sensitive adhesive layer 208 can be coated on the polymer film 204 and a release coating 210 can be coated on the pressure sensitive adhesive layer 208. Optionally, a liner film 212 can be applied over the release coating 210. Alternatively, the release coating 210 can be coated on the liner film 212, and the combined layers (210, 212) contacted to the pressure sensitive adhesive layer 208 at the release coating surface (210).

The polymeric layer 204 can be formed of the polymers described above in relation to the substrate film 102. The antistatic coating 206 can include static dissipative polymers, such as polyether block amides, ionomers, polyimides, polyamides, or any combination thereof.

In another example, the antistatic coating 206 can include a filled polymer. The polymer can include an acrylate, a polyolefin, a polyurethane, a polyester, a polyether, a polyamide, a polyimide, a polyaryletherketone, or any combination thereof. An exemplary filler can include conductive filler, such as metal particles, conductive ceramic particles, carbon black, conductive fibers, carbon nanotubes, graphene, or any combination thereof. In a further example, the antistatic coating can include deposited metal layers, such as sputtered or vapor deposited layers.

In a particular, the antistatic coating 206 can have a surface resistivity in a range of $10^5$ to $10^{12}$ ohms/sq. For example, the surface resistivity of the antistatic coating can be in a range of $10^8$ to $10^{12}$ ohms/sq, such as $10^9$ to $10^{12}$ ohms/sq.

The pressure sensitive adhesive layer 208 and release coating 210 can be formed of the materials described above. In particular, the release coating 210 includes an agent, such as a catalyst, that activates at least one component of the pressure sensitive adhesive layer 208.

Optionally, a liner film 212 can be applied over the release coating 210. In an example, the liner film 212 includes a film or paper that adheres to the release coating. An exemplary polymer film can include a polyolefin, an acetate, an acrylic, a polyaryletherketone, a polyester, a polyether, a polyamide, polyimide, a thermoplastic elastomer, a styrenic polymer, a liquid crystal polymer, a fluoropolymer, or any combination thereof. In an example, the release liner 212 includes a cellulose acetate film. In another example, the liner film 212 includes a polyolefin film. In a further example, the liner film 212 includes a polyester film. In an example the liner film 212 may be treated to improve adhesion to the release coating, for example with corona discharge, plasma discharge, ion treatment or similar. The liner film 212 can have a thickness in a range of 0.5 mils to 5 mils, such as a range of 0.5 mils to 3 mils, or even a range of 1 mil to 3 mils.

Figure 3:
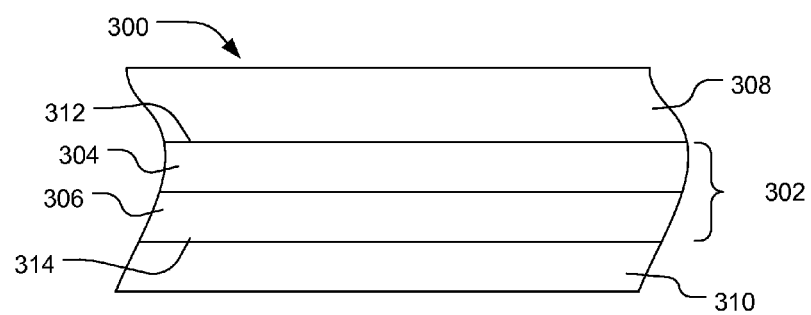

In another exemplary embodiment illustrated in FIG. 3, a multilayer film 300 can include a substrate film 302. In an example, the substrate film 302 includes a polymeric film 304 and an antistatic layer 306. In the exemplary multilayer film 300, a pressure sensitive adhesive 308 can be disposed on a first major surface 312 of the substrate film 302 whereas the release coating 310 can be disposed on an opposite major surface 314 of the substrate film 302. When the multilayer film is rolled into a roll for later dispensing, the release coating 310 is placed in contact with the pressure sensitive adhesive layer 308 and facilitates curing or crosslinking of the pressure sensitive adhesive layer 308.

Figure 4:
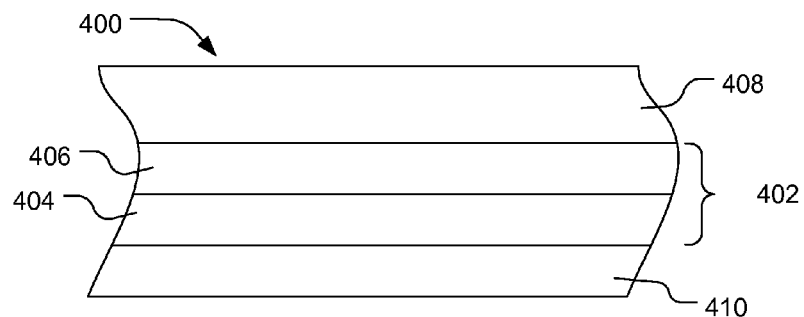

While the multilayer polymeric substrate is illustrated as having the antistatic layer 306 on a major surface of the substrate film 302 in contact with the release coating 310, the antistatic coating and other layers can be rearranged. For example, a multilayer film illustrated in FIG. 4 includes a polymeric substrate 402 in which the polymeric layer 404 is in contact with the release coating 410 and an antistatic layer 406 is in contact with the pressure sensitive adhesive layer 408. When the film 400 is rolled, the release coating 410 including the agent active to at least one component of the pressure sensitive adhesive composition in pressure sensitive adhesive layer 408 comes in contact with the pressure sensitive adhesive layer 408, resulting in curing and crosslinking of the pressure sensitive adhesive composition of layer 408.

Figure 5:
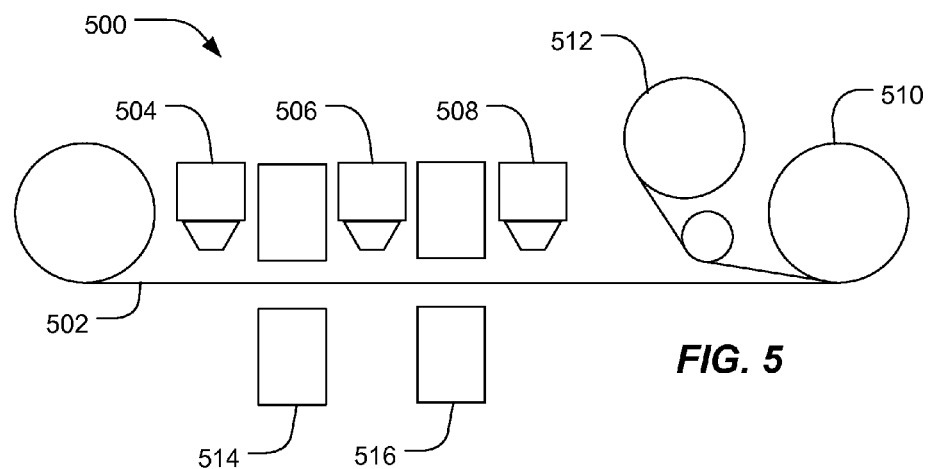
FIG. 5 includes an illustration of an exemplary method for forming a multilayer film.

FIG. 5 includes an illustration of an exemplary process for forming a multilayer film. For example, the process 500 includes a roll of substrate film 502 from which the substrate film is dispensed. The substrate film 502 can include one or more layers of a polymeric film. Optionally, the substrate film includes an antistatic layer. Alternatively, an antistatic layer can be dispensed as a coating at coating station 504 and cured. The antistatic coating (not illustrated) can be designed to cure at a room temperature, in response to heat, in response to actinic radiation with some other curing mechanism. For example, the antistatic coating can be treated in an oven 514.

In addition, a pressure sensitive adhesive composition can be coated over the substrate film 502 at coating station 506. The pressure sensitive adhesive composition can be selected from the compositions disclosed above. Optionally, the pressure sensitive adhesive composition can be baked or dried, such as in an oven 516. Alternatively, the pressure sensitive adhesive composition can be treated with actinic radiation.

In addition, a release coating can be applied over the pressure sensitive adhesive composition at coating station 508. The release coating includes an agent active to at least a component of the pressure sensitive adhesive composition dispensed at 506. In an example, the release coating is not heat treated following deposition. Alternatively, the release coating can be cured through actinic radiation or heat treatment.

Alternatively (not illustrated in FIG. 5), the release coating can be applied to an opposite major surface of the substrate film 502 to the pressure sensitive adhesive composition applied at 506. When the multilayer film is rolled into a roll 510, the release coating applied at 508 comes into contact with the opposite surface of the multilayer film that has the pressure sensitive adhesive coating.

While the coating stations (504, 506 or 508) are illustrates as dispensing over the substrate film 502, other coating technologies can be used to apply coating layers. For example, roll coating, gravure coating, knife coating, dip coating, spray coating, slot die coating, or variations thereof.

Optionally, the system 500 includes a roll 512 for dispensing a liner film over the release coating dispensed at 508. The multilayer film is rolled into a roll 510 to be stored for later use. Variations of this process are possible. For example, as disclosed above, the release coating station 508 may dispense release coating on to liner film from roll 512 and a lamination station may join this substructure to the substrate film/release coated substructure.

Once formed, the multilayer film can have a peel strength of the pressure sensitive adhesive layer against a stainless steel plate of not greater than 1000 g/in, such as a peel strength in a range of 2 g/in to 500 g/in, a range of 3 g/in to 200 g/in, or 4 g/in to 100 g/in. The peel strength is measured at an angle of 180° and a peel rate of 12 in/min, to stainless steel plate.

Further, the curing performance can be measured as a Cure Index, defined as the ratio of the peel strength at 18 hours divided by the peel strength at 7 days. In particular, the multilayer film can have a Cure Index of not greater than 2, such as not greater than 1.5 or even not greater than 1.2.

Example

An adhesive mix is prepared, which includes acrylic adhesive, an isocyanate cross-linker and dibutyltin dilaurate catalyst. The mix is casted on 2 mil thick polyethylene terephthalate (PET) sheets and dried in an oven at 135° C. for 1.5 minutes. The final thickness of the pressure sensitive adhesive is between 0.55 mils and 0.6 mils One set of sheets is covered with a tin-containing silicone-release coated liner; the other set is covered with a silicone-release coated liner, which is free of tin catalyst. The samples are aged at room temperature for 18 hours, 3 days or 7 days. After aging for the specified time, the release-coated liner is removed and the PSA is laminated to a PET substrate with a 4.5 lb lab roller. After 20 minutes dwell, the peel adhesion of the PSA is tested and recorded. The peel test parameters are 180° and 12 in/min.

As shown in Table 1 below, after 18 hours, the peel strength of the sample with tin-containing silicone-release coated liner has reached a full cure, however the peel strength of the sample with the tin-free silicone-release coated liner is still high. After three days aging, the PSA with the tin-free silicone-release coated liner is close to a full cure.

TABLE 1

Peel Adhesion of Samples

| Release Coated Liner | Aging | Peel Strength (g/in) |
|---|---|---|
| With Tin Catalyst | 18 hours | 23.6 |
|  | 3 days | 22.1 |
|  | 7 days | 18.4 |
| Free of Tin Catalyst | 18 hours | 106.5 |
|  | 3 days | 33.2 |
|  | 7 days | 30.6 |

In particular, it was discovered that the cure time or the time at which the adhesive has essentially reached its steady state value can be reduced by adding a catalyst to the release layer. While curing time can be accelerated by adding a catalyst to the pressure sensitive adhesive composition, increasing the catalyst amount in the pressure sensitive adhesive composition leads to low pot life and high viscosity during coating. Absent the present discovery, low catalyst in the pressure sensitive adhesive composition leads to long cure times and potentially poor curing. With catalyst in the release coating, the amount of catalyst in the pressure sensitive adhesive composition can be reduced or eliminated, providing long pot life during manufacturing, while providing low cure time after coating.

Note that not all of the activities described above in the general description or the examples are required, that a portion of a specific activity may not be required, and that one or more further activities may be performed in addition to those described. Still further, the orders in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A multilayer film comprising:
    a substrate film having first and second major surfaces;
    a pressure sensitive adhesive layer disposed on the first major surface of the substrate film, the pressure sensitive adhesive layer including a curable composition; and
    a release layer disposed on the pressure sensitive adhesive layer opposite the substrate film, the release layer including a release material and a catalyst adapted to cure the curable composition of the pressure sensitive layer.

2. The multilayer film of claim 1, wherein the release material is a silicone-based, fluorine-based, long-chain alkyl-based, fatty acid amide-based, silica powder material, or any combination thereof.

3. The multilayer film of claim 1, wherein the curable composition includes a polymer including natural rubber, a styrenic block copolymer, an acrylate, a polyurethane, a silicone, polydiorganosiloxane polyurea copolymers, or any combination thereof.

4. The multilayer film of claim 1, wherein the curable composition includes a cross-linking agent.

5. The multilayer film of claim 1, wherein the catalyst is an organometallic catalyst, an amine catalyst, or a combination thereof.

6. The multilayer film of claim 1, wherein the substrate film includes a polymer film.

7. The multilayer film of claim 1, wherein the substrate film includes an antistatic layer.

8. The multilayer film of claim 1, further comprising a liner film disposed on the release layer opposite the pressure sensitive adhesive layer.

9. The multilayer film of claim 1, wherein the curable composition has a peel strength of not greater than 500 g/in.

10. The multilayer film of claim 1, wherein the multilayer film has a Cure Index of not greater than 2.

11. A multilayer film comprising:
    a substrate film having first and second major surfaces;
    a pressure sensitive adhesive layer disposed on the first major surface of the substrate film, the pressure sensitive adhesive layer including a curable composition including a polymer and a crosslinking agent;
    a release layer disposed on the pressure sensitive adhesive layer opposite the substrate, the release layer including a release material and a catalyst adapted to cure the curable composition of the pressure sensitive adhesive layer such that a peel strength of the multilayer film is lower than that of an identical multilayer film that does not include a catalyst in a release layer of the identical multilayer film; and
    a liner film on the release coating.

12. The multilayer film of claim 11, wherein the release material is a silicone-based, fluorine-based, long-chain alkyl-based, fatty acid amide-based, silica powder material, or any combination thereof.

13. The multilayer film of claim 11, wherein the polymer including natural rubber, a styrenic block copolymer, an acrylate, a polyurethane, a silicone, polydiorganosiloxane polyurea copolymers, or any combination thereof.

14. The multilayer film of claim 11, wherein the catalyst is an organometallic catalyst, an amine catalyst, or a combination thereof.

15. The multilayer film of claim 11, wherein the liner film is a polyolefin, an acetate, an acrylic, a polyaryletherketone, a polyester, a polycarbonate, a polyvinyl chloride, a polyether, a polyamide, polyimide, a thermoplastic elastomer, a styrenic polymer, a liquid crystal polymer, a fluoropolymer, or any combination thereof.

16. The multilayer film of claim 11, wherein the curable composition has a peel strength of not greater than 500 g/in.

17. The multilayer film of claim 11, wherein the multilayer film has a Cure Index of not greater than 2.

18. A method of forming a multilayer film, the method comprising:
    dispensing a substrate with first and second major surfaces;
    coating the first major surface of the substrate with a curable pressure sensitive adhesive composition; and
    coating with a release coating to contact the curable pressure sensitive adhesive composition, the release coating including a release material and a catalyst adapted to cure the curable pressure sensitive composition.

19. The method of claim 18, further comprising dispensing a liner film on the release coating.

20. The method of claim 18, wherein coating with the release coating includes coating the release coating on the second major surface of the substrate opposite the curable pressure sensitive adhesive composition and rolling the multilayer film to contact the release coating with the curable pressure sensitive adhesive composition.

* * * * *